United States Patent

[11] 3,584,219

[72] Inventors Heribert K. Herglotz;
Charles D. Reilly, both of Wilmington, Del.

[21] Appl. No. 795,161
[22] Filed Jan. 30, 1969
[45] Patented June 8, 1971

[73] Assignee E. I. Du Pont De Nemours And Company
Wilmington, Del.

[54] X-RAY GENERATOR HAVING AN ANODE FORMED BY A SOLID BLOCK WITH A CONICAL BORE CLOSED BY A TARGET TOIL
2 Claims, 15 Drawing Figs.

[52] U.S. Cl. ........ 250/90, 250/93, 250/105, 313/56, 313/57
[51] Int. Cl. ........ H01j 35/08, H01j 35/14
[50] Field of Search ........ 250/90; 313/330, 57, 56

[56] References Cited

UNITED STATES PATENTS

| | | | |
|---|---|---|---|
| 2,046,808 | 7/1936 | Bouwers et al. | 313/57 |
| 2,090,636 | 8/1937 | Olshevsky | 250/90 |
| 2,168,780 | 8/1939 | Olshevsky | 250/90 |
| 2,760,055 | 8/1956 | Laster | 313/56 |

*Primary Examiner*—James W. Lawrence
*Assistant Examiner*—C. E. Church
*Attorney*—Harry J. McCauley

ABSTRACT: An improved X-ray generator for X-ray diffraction and X-ray microscopy utilizing its electrical energy input so advantageously that both power requirements and objectionable heat generation are markedly reduced, with accompanying reduction in apparatus size and enhancement of portability.

INVENTORS
Heribert K. Herglotz
Charles D. Reilly
BY Harry J. McCauley
ATTORNEY

INVENTORS
Heribert K. Herglotz
Charles D. Reilly
BY Harry J. McCauley
ATTORNEY

PATENTED JUN 8 1971

3,584,219

SHEET 03 OF 10

INVENTORS
Heribert K. Herglotz
Charles D. Reilly
BY
Harry J. McCauley
ATTORNEY

INVENTORS
Heribert K. Herglotz
Charles D. Reilly
BY Harry J. McCauley
ATTORNEY

PATENTED JUN 8 1971 3,584,219

INVENTORS
Heribert K. Herglotz
Charles D. Reilly
BY Harry J. McCauley
ATTORNEY

Inventor
Heribert K. Herglotz
Charles D. Reilly
By Harry J. McCauley
Attorney

INVENTORS
Heribert K. Herglotz
Charles D. Reilly
BY
Harry J. McCauley
ATTORNEY

INVENTERS
Heribert K. Herglolz
Charles D. Reilly
BY Harry J. McCauley
ATTORNEY

Inventor
Heribert K. Herglotz
Charles D. Reilly

By Harry J. McCauley
Attorney

INVENTORS
Heribert K. Herglotz
Charles D. Reilly
BY Harry J. McCauley
ATTORNEY

X-RAY GENERATOR HAVING AN ANODE FORMED BY A SOLID BLOCK WITH A CONICAL BORE CLOSED BY A TARGET TOIL

BRIEF SUMMARY OF THE INVENTION

Generally, this invention comprises an X-ray generator provided with a cathode member, a target block adjacent the cathode member formed with a frustoconical through-bore cavity of approximately 3°—7°° total angle aligned axially with the electron beam output of the cathode member with the large diameter opening of the frustoconical cavity disposed towards the cathode member, means maintaining the target block at a high relative positive potential with respect to the cathode member, and a target foil window constituting an exit for X-ray radiation emission closing off the small diameter opening of the frustoconical cavity.

DRAWINGS

The following drawings detail the construction and operation of three embodiments of this invention, as to which:

FIG. 1 is a partially schematic side elevation cross-sectional view of a first embodiment of X-ray generator according to this invention, FIG. 2 is a somewhat enlarged side elevation partially schematic view of a modified television tube gun employed as electron source and beam focusing means for the X-ray generator of FIG. 1, FIG. 3 is a partially schematic side elevation cross-sectional view of a second embodiment of X-ray generator according to this invention, FIG. 4 is a side elevation cross-sectional view of the target structure of the embodiments of FIGS. 1 and 3, FIG. 5 is a block diagram of a practicable portable power supply for the embodiment of X-ray generator shown in FIGS. 1 and 2, FIG. 6 is a schematic view of the X-ray generator of this invention as employed with a Polaroid Land camera film holder arranged for back-reflection X-ray diffraction operation, FIG. 7 is a typical back-reflection X-ray diffraction pattern obtained from a nickel sample with the apparatus of FIG. 6, FIG. 8 is a schematic view of the X-ray generator of this invention as employed with a Polaroid Land camera film holder arranged for transmission X-ray diffraction operation, FIG. 8A is an X-ray diffraction pattern obtained from a paraffin sample with the apparatus of FIG. 8, FIG. 8B is an X-ray diffraction pattern obtained from a paraffin sample using a typical commercial X-ray diffraction tube apparatus provided with a Polaroid Land camera film holder arrangement similar to that of FIG. 8, FIG. 9 is a schematic view of the X-ray generator of this invention arranged for use as an X-ray microscope, FIG. 9A is a schematic view of a pumped variation of the apparatus of FIG. 9, FIG. 10 is an X-ray micrograph obtained with the apparatus of FIG. 9A in the comparison of two foamed polymeric specimens, FIG. 11 is a partially schematic side elevation cross-sectional view of a third embodiment of X-ray generator according to this invention utilizing a pair of cooperating target block frustoconical cavities arranged in back-to-back relationship one with respect to the other, and FIG. 11A is a perspective cutaway view of the X-ray generator subassembly of the embodiment of FIG. 11.

DETAILED DESCRIPTION

Figure 1:
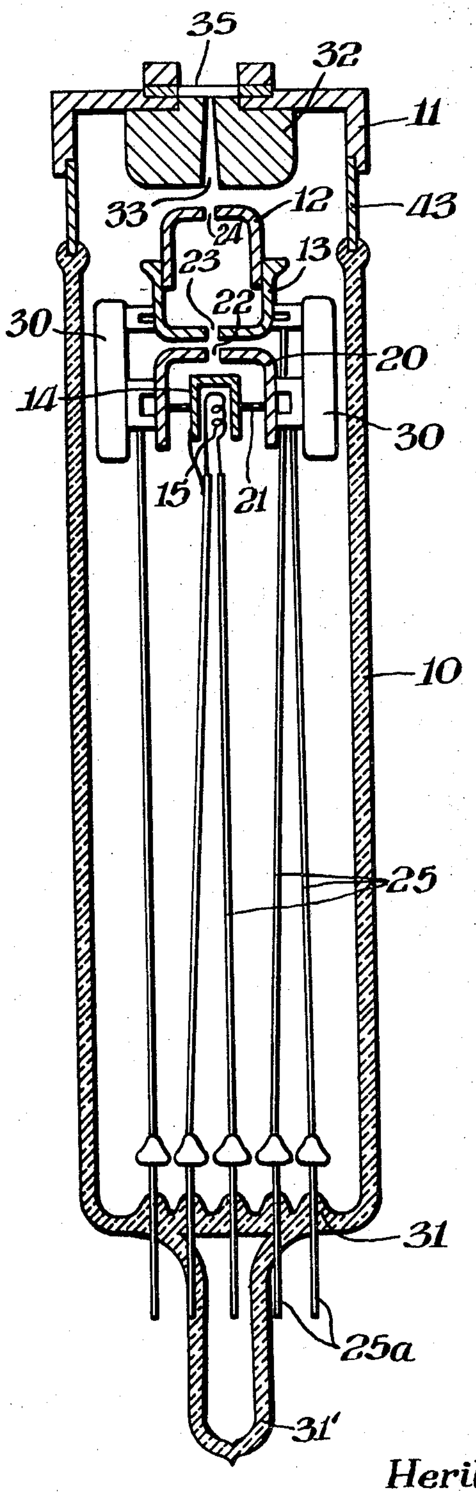

There has long been a need for an X-ray diffraction analysis apparatus which is suited to general inprocess use or nondestructive testing (or analysis) on the manufacturing lines of industrial plants, as distinguished from the special-purpose X-ray analytical apparatus hitherto employed in laboratory evaluations. It is not essential that such process line equipment possess the extreme precision of measurement capability of laboratory apparatus, so long as it affords sufficient information upon which to base reliable decisions bearing on the conduct of manufacturing operations.

To date it has not been practicable to extend the use of X-ray analytical apparatus from the laboratory to the plant, because of the relatively large power consumption requirements, coupled with the necessity for elaborate cooling systems to dissipate the large amounts of heat liberated during the X-ray generation.

By this invention there is provided an X-ray generator which utilizes its electrical energy input so efficiently that it can be made relatively small in size and so compact as regards its power supply that the latter can be made portable along with the instrument itself. Moreover, the target area is formed to a configuration which distributes the finely focused electron beam over an area considerably larger than the beam cross section area, thus practically completely eliminating target erosion from local overheating as a result of intense electron bombardment. In addition, the small energy requirement of the tube combined with the target configuration, which dissipates the heat liberated during X-ray generation so effectively, obviates the use of circulated coolant, further enhancing portability. It will be understood that, while the foregoing advantages are critical in the provision of a portable X-ray generator, they are highly desirable as well for laboratory or other conventional apparatus, and the invention is accordingly thus not limited to portable applications exclusively.

Another disadvantage of conventional X-ray analytical apparatus has been the employment of time-consuming photographic data recording techniques which delay the availability of analysis results past the time when they are of much use for inprocess control purposes.

The apparatus of this invention is ideally suited to speedy photographic data recording, such as by use in conjunction with a Polaroid Land camera attachment, and this contributes importantly to its utility.

The low energy demand of the X-ray generator of this invention, which is of the order of 10 percent or less that of comparable commercial X-ray tubes, is achieved in great part by utilizing a target block of suitable metal to give the desired radiation wavelength (e.g., copper for λ of 1.54A, commonly used in X-ray diffraction analysis, or aluminum, chromium, iron, cobalt, silver, or other metals specifically chosen to produce wavelengths especially effective in the application involved) formed as a small diameter truncated conical hole, the smaller diameter end of which is covered by a thin foil of the same metal. A beam of electrons focused into the larger diameter end of this truncated conical hole, excites emission of characteristic X-radiation from both the walls of the hole and the target foil. The truncated conical hole produces additional useful radiation by secondary excitation from the glancing impact of "upspent" electrons, bremsstrahlung and primary radiation proceeding down the hole to the foil. The foil acts both as part of the target and as a tube window transmitting the radiation.

The target of this invention produces a high intensity, small-divergence beam of X-rays so efficiently that the generator can be made small, compact and rugged, particularly adapting it to service in manufacturing process areas. Moreover, the target cavity structure functions as an excellent heat dissipation sink which, coupled with the low energy requirement for a given high intensity X-ray output, eliminates the necessity for water cooling or finned structures for anode protection.

Finally, the reduced energy demand renders possible a significant simplification in power supply design, so that a truly portable power supply is feasible. Thus, our source requires only 6—12 watts for target bombardment and only a little more than 2 watts for cathode heating. For this low power level, a small portable battery-operated power supply is entirely practicable. For example, with a copper anode tube, completely satisfactory operation is achieved at the 30 kv. level, which can be provided by a compact, relatively lightweight easily portable power supply which can be conveniently carried about the manufacturing plant and used in even quite congested areas.

Figures 2, 4:
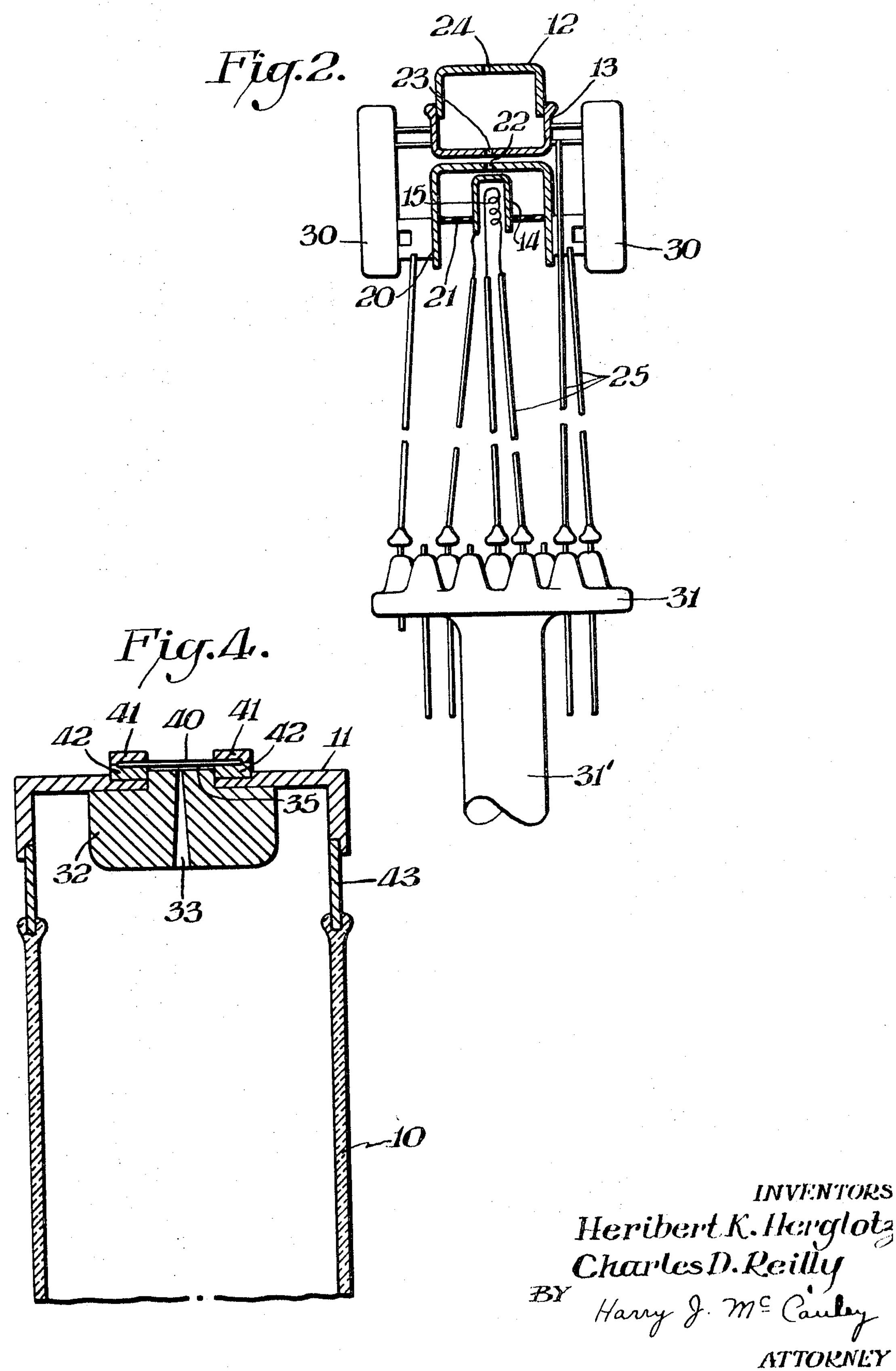

Referring to FIGS. 1 and 2, a relatively low cost embodiment of this invention utilizes a commercially available television tube electron gun, such as Model SE-5T/5W of the Superior Electronics Corporation, as the electron source, modified, however, as hereinafter described.

The electron gun, as-received, incorporates an electron-emitting cathode cup 14 heated to electrons by passing current through helical coil filament 15 disposed adjacent its underside. Cathode cup 14 is held in place concentrically within control grid cup 20, axially drilled at 22, by insulating wafer 21. Grid cup 20 is surmounted by an axially drilled upstanding cuplike accelerating electrode 13 and these two latter components are maintained in place by radially disposed insulators 30 which both space and align them with respect to the inside wall of vacuum-tight glass envelope section 10 which houses the entire construction. Electrical connections to the several components so far described are made via rigid leads 25 passing through and fused into glass insulator base 31, the leads thus constituting the support for the various elements whereas the outboard ends 25*a* serve as electrical pin connections outside the tube.

The commercial electron gun hereinabove described is modified by the elimination of its usual high potential focusing tube and the provision of an inverted stainless steel cup 12 concentrically drilled at 24 telescoped within the open end of accelerating electrode 13. The entire construction is closed off at the top with a centrally drilled metal tube cap 11 soldered at its periphery to the upper end of metal joinder ring 43 having a coefficient of expansion compatible with that of envelope 10, thereby permitting a vacuum-tight fused glass-metal joint at the confronting periphery. The central bore of tube cap 11 receives the protuberant outboard butt end of anode target 32 provided with central frustoconical bore 33, to which it is attached in leak-tight relationship by soldering. The outwardly facing small diameter opening of bore 33 is closed off by foil target window 35.

The complete tube so far described is relatively small in size, measuring only 1.542 inch in diameter with overall length of 5 inches, the tube being operable by plug connection to the pin connection extensions 25*a* of leads 25 via a conventional flexible high voltage cable running to an appropriate power supply.

In operation, when a voltage of, normally, 6 volts is applied to cathode heater filament 15, cathode cup 14 becomes heated and emits electrons, which can be drawn off by an adjoining positive potential, although electron flow is limited to a relatively small diameter beam by the restriction interposed by aperture 22. The number of electrons in the stream (i.e., the beam current) is controllable, as in conventional radio vacuum tubes of the triode, tetrode or pentode type, by regulation of the potential of grid cup 20 with respect to cathode cup 14. In television tube operation, such control of beam current affects the modulation of intensity providing light and dark areas in picture formation. It is sometimes advantageous to utilize this beam current control in X-ray generation, whereby beam current decreases as grid 20 is adjusted to a progressively increased negative potential with respect to cathode 14. However, beam control as described is not absolutely essential, and successful tubes according to this invention have been fabricated wherein cathode 14 and control grid 20 were connected together within the tube.

Figure 3:
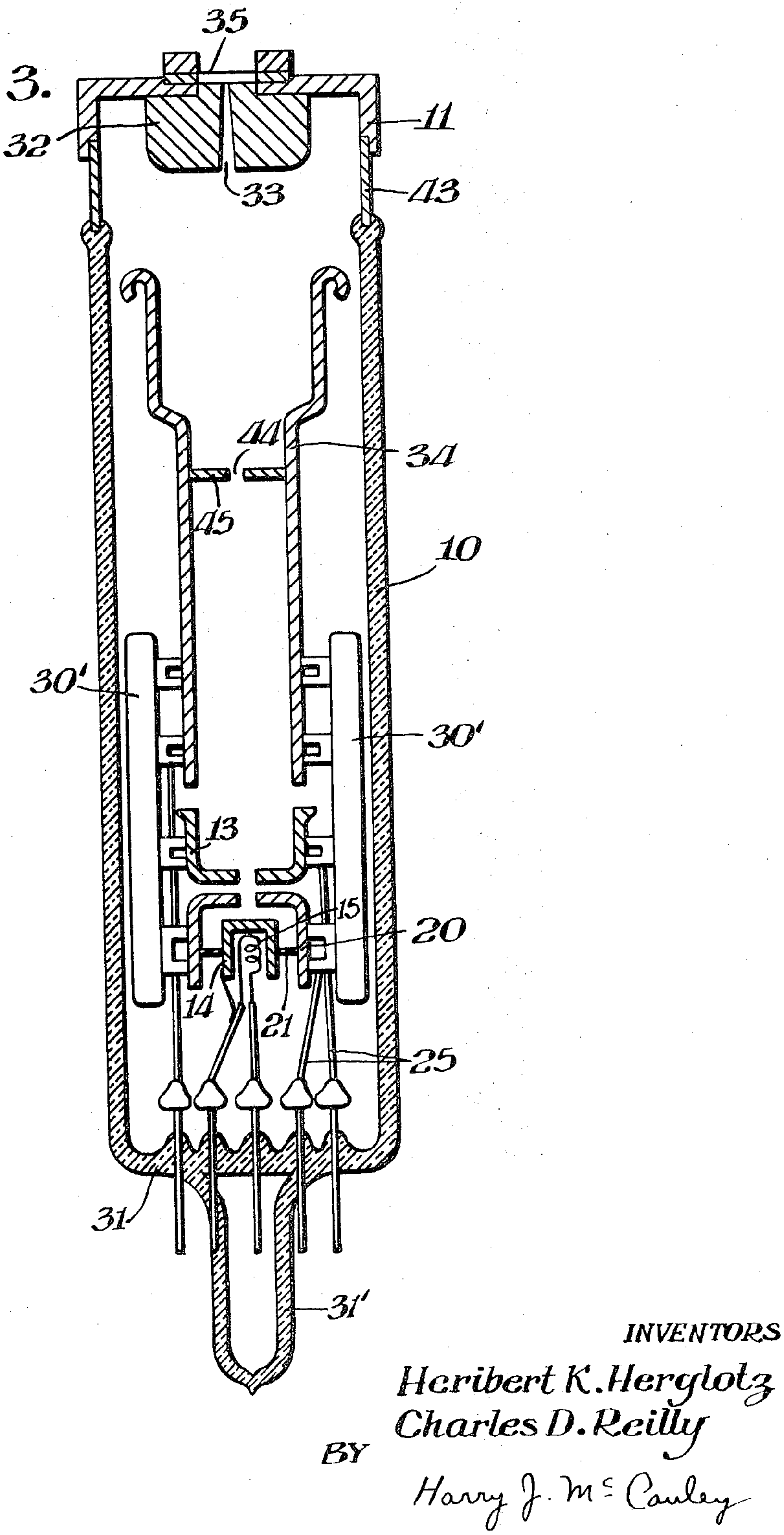

It is essential, according to this invention, that there be employed an electron beam concentrated to a small diameter adapted to enter the large diameter mouth of the frustoconical target cavity bore 33 without impinging on any part of the broad area of the anode target face, and this is achieved by appropriate electrical potential maintenance and aperture sizes. Thus, a small diameter electron beam is obtained by applying a positive potential of, typically, ±300 volts to accelerating cup electrode 13 with respect to cathode 14. In addition, aligned apertures 23 in cup 13 and 24 in cup 12 limit the beam size, and the face of cup 12 is disposed very close to anode target 32, typically 0.080 inch, so that the electron beam diverges very little before entering bore 33. If desired, the Superior Electronics Corporation's Model SE-5T/5W electron gun can be used without modification as shown in FIG. 3, with retention of the tubular beam constricting electrode 34. However, in this form it is necessary to impress a positive potential of typically 3000 volts on tubular electrode 34 with respect to cathode 14, in addition to the +300 volts on accelerating electrode 13, which produces a finer cross section high velocity electron beam by the lenslike action of the potential gradient pattern at each end of tubular electrode 34. Due to the absence of field within tubular electrode 34, the electron gun, as-received, is provided with a plate 45 drilled with a central aperture 44 of, typically, 3/32-inch diameter located approximately one-third of the length from the electrode 34 exit in order to limit the beam diameter in transit in order to preserve maximum lens action of the field gradient at the exit end.

The embodiment of FIG. 3 does not necessarily require a longer tube structure than that of FIGS. 1—2; however, it does require provision in the power supply for an additional voltage. A partially countervailing advantage is that electrical leads 25 are shorter and therefore furnish a stronger and more rigid support for the electrode structure. It might be mentioned that the long leads of the apparatus of FIGS. 1—2 are required in order to provide a sealed tube sufficiently large to simplify residual outgassing and the forestalling of objectionable corona discharge at the high voltages employed. Alignment and support are provided by longer insulators 30′ than used for the FIG. 1—2 embodiment.

The details of target anode structure are shown in FIG. 4. A typical target cavity 33 has a large diameter opening of 0.032 inch, a length of 0.315 inch and terminates in a small exit diameter of 0.016 inch. The small cross section electron beam enters the large diameter opening of cavity 33 at high velocity under the influence of the high positive potential of anode target 32 with respect to cathode 14 (typically 30 kv. for a copper anode or typically 10 kv. for an aluminum anode). A relatively larger fraction of the X-radiation produced by bombardment of the walls of cavity 33 and target foil window 35, estimated at 10—15 percent of the total generated, passes out of the tube as a high-intensity small cross section X-ray beam exiting from foil window 35. Since such a large fraction of the X-radiation produced is emitted as a useful beam, a much smaller energy input is required to achieve X-radiation intensities comparable to those generated in tubes known to the art, such as the best commercially available types.

The relatively wasteful performance of conventional X-ray tubes can be understood when standard X-ray diffraction tube operation is analyzed. Normally, electron beams are brought to a line focus on a flat target, so that the impingement area is typically 1 mm. × 10 mm. When such a line focus is viewed along its length at an angle of 6° from the surface of the target, it appears as a source 1 mm. square. Tubes are available which are equipped with two windows to permit beams from each end of the line focus to emerge as though produced from 1 mm. square sources. It is apparent, however, that these small solid angle beams, useful for diffraction analysis, represent only a very small fraction (typically less than 1 percent) of the 180° solid angle of X-radiation generated.

In one comparable widely used commercial X-ray tube the electron bombardment area is 10 sq. mm. and a normal operation current is 17 ma. at 50 kv. for a water-cooled copper target. A tube constructed according to this invention, with target cavity 33 of the dimensions hereinbefore given, has a bombardment area of about 7.5 sq. mm., with target foil 35 presenting an additional area of about 0.13 sq. mm., and for useful X-ray generation operating currents of only 0.08—0.60 ma. at 30 kv. are required with a Cu target. Such a reduction in operating current magnitude with lower acceleration potential and the accompanying reduction in current density per unit area of the anode surface effectively limits localized anode erosion that would normally occur from intense electron bombardment. Total target heating is a function of both the potential and the current. For equivalent X-ray flux output, the heat dissipation in the tube of this invention is in excess of an order of magnitude smaller and, in addition, heat dissipation is enhanced by the volume flow of heat from the cavity form target as compared with heat flow away from a conventional flat target surface. Under these circumstances special cooling of the anode structure can safely be dispensed with and inherent heat dissipation capability relied upon exclusively.

Target foil 35 is typically 0.0002 inch thick and is protected by a 0.005 inch thick X-ray transmitting beryllium foil window 40. The two foils 35 and 40 are held in a small metal sandwich-structured bezel 41, 42, conveniently fabricated from Monel metal, which, together with anode target 32, are secured to metal tube cap 11 by soldering or by an equally appropriate vacuum-tight sealing means.

Typical dimensions of the X-ray generators and their component parts and spacings are as follows:

Overall length of the X-ray generators of FIGS. 1, 2 and FIG. 3 measured from the exterior face of bezel 41 (which holds target window 35 in place) to the glass tube sealed off end is 6 inches, or, from the face of bezel 41 to the inside face of insulator base 31 is 5 inches.

Target block 32 has a longitudinal thickness of 0.300 inch—0.350 inch and a diameter within the tube of, typically, three-fourths inch. The target block protrusion through metal tube cap 11 is nominally about ¼-inch diameter, whereas bezel pieces 41 and 42 are typically ½ inch outside dia. with a ¼-inch dia. central bore, providing a corresponding ¼-inch dia. window area for reception of the foil target window 35 (typically, 0.0002 inch thick for Cu) and the backup strengthening beryllium window 40 (typically, 0.005 inch thick).

Target cavity 33 is a truncated conical hole having inner entrance diameter typically 0.030 inch—0.035 inch and an outer terminal diameter typically 0.015 inch—0.018 inch with a length of, typically, 0.315 inch. The target cavity preferred configuration can best be prescribed by its total (i.e., included) angle, which measures, typically, 3°—7° to provide a tapered area having a relatively large ratio of actual surface area to projected area and a small enough angle to produce multiple reflection of energy down the cavity, but not so small as to inordinately reduce radiation intensity output by target surface absorption.

The electron gun assembly is positioned within tube 10 with axial alignment of cavity 33 and the apertures 22, 23 and 24, the latter having diameters of typically 0.030 inch, 0.0375 inch and 0.025 inch, respectively. The gun is also positioned with a close spacing (typically 0.080 inch) between the external face of electrode cup 12 and the confronting face of cavity block 32, whereas the spacing between grid cup 20 and accelerating electrode 13 is, typically, 0.046 inch. The combined axial length of cups 12 and 13 in assembled partially telescoped relationship is typically 0.375 inch.

For the embodiment of FIG. 3 specifically the electron gun is positioned close to glass insulator base 31 with shortened leads 25, so that the plane of the flared bell end of focusing electrode 34 is located a distance of, typically, one-half inch or more from the confronting face of target block 32. For spacings greater than five-eighth inch, the overall tube length must be increased to provide length for the electron gun, and this is conveniently accomplished by increasing the axial lengths of either tube cup 11 or metallic joinder ring 43. This has the advantage of maintaining a close relative positioning between metallic pieces, which improves tube operation by reducing the buildup of electric charges on the inside surface of glass envelope 10 by limiting the area of envelope 10 exposed to stray electrons or ions resulting from secondary emission, which have insufficient energy to return to target block 32. With a closely adjacent metallic ring 43 or metallic tube cap 11, stray charges, rather than collecting on the glass envelope 10, easily reach these metallic elements, which, being electrically conductive, completes the circuit back to the power supply. A buildup of charges on glass envelope 10 is disadvantageous, because the charges are not easily dissipated and cause field distortions as well as occasional sparklike discharges, both of which are detrimental to proper tube operation.

Typical dimensions of electrode tube 34 are: small tube dia. one-half inch and 2 inches long, flared bell end three-fourth inch long, 13/16-inch dia. having a rolled end 15/16 inch outside dia. Apertured plate 45 is typically located 1⅝ inch from the small diameter end of tube 34.

Figure 5:
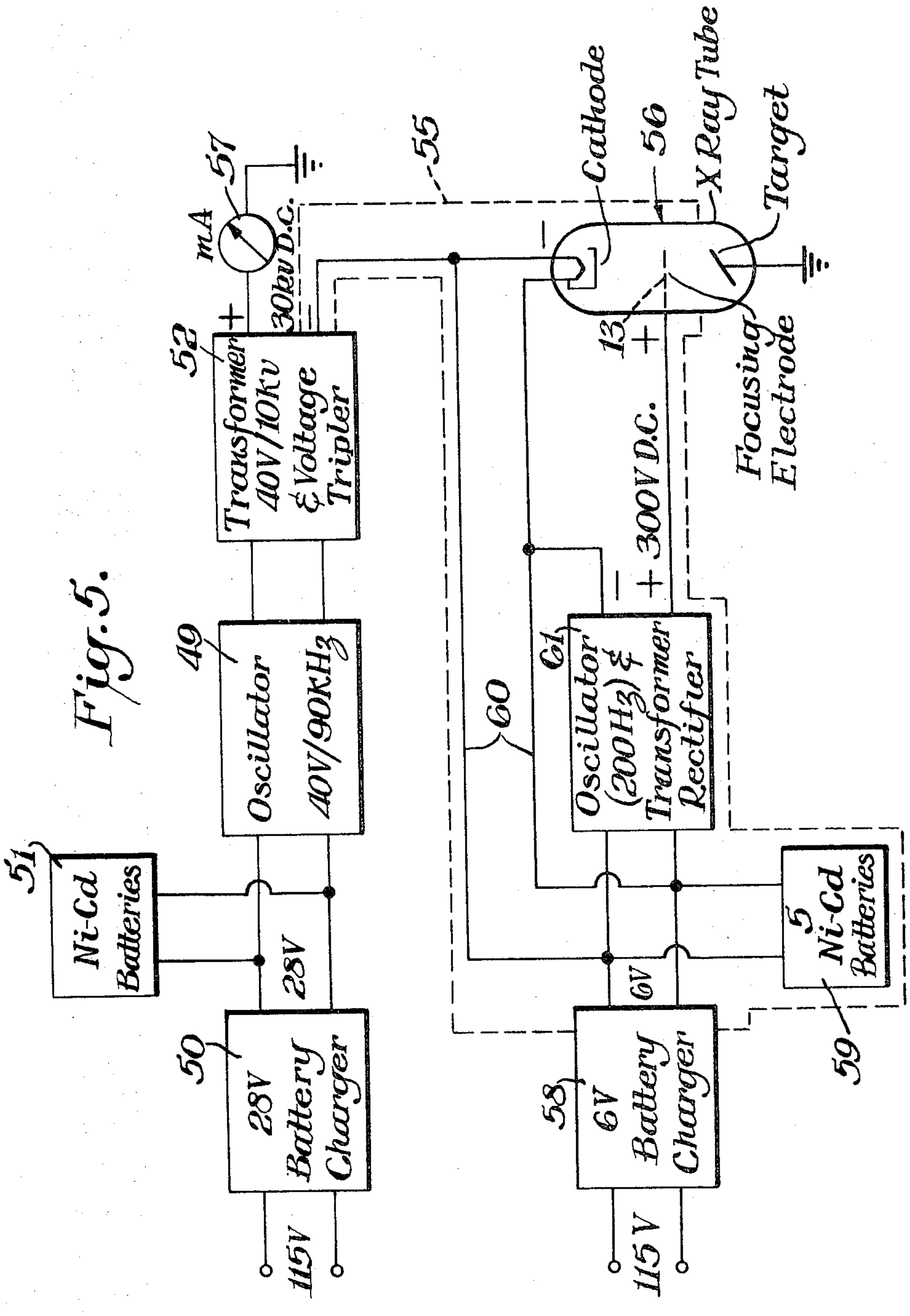

Referring to FIG. 5, there is shown, in block diagram form, a simplified portable power supply which has been developed for the X-ray generator of this invention, which is suited to use with the FIG. 1, 2 embodiment particularly but which can be adapted for use with the FIG. 3 embodiment by relatively slight modifications hereinafter described.

The power supply as such, exclusive of batteries, is quite compact, measuring approximately 11 inches × 11 inches × 9½ inches, and can be accommodated, together with the X-ray tube, cable, camera and other attachments, within a carrying case measuring approximately 19 inches long × 11½ inches wide × 11 inches high, the total weight being about 35 lbs. In many plant areas it is convenient to connect into the existing electric power lines, thus rendering it unnecessary to carry along batteries for self-contained powering; however, it is preferred to provide for optional battery powering where required, and this is done by housing the batteries in a separate carrying case measuring approximately 14 inches × 8½ inches × 6 inches.

The combination power supply, adapted to optional self-contained powering or plug-in connection with existing electric supply lines, is depicted in FIG. 5. This incorporates an oscillator 49 generating a 40v. 90 kHz. output when supplied with 28 v. energization from battery charger 50, in turn connected to the usual 115 v. plant electrical supply, where convenient, or, optionally, from the power pack of Ni-Cd batteries 51, where self-contained powering is essential. The output of oscillator 49 is first transformed to a value of 10 kv. by a coreless transformer and then the voltage is raised to 30 kv. in a voltage tripler-rectifier, shown together as a common block 52, thereby producing the operating voltage for a copper anode X-ray generator. The 10 kv. required for operation of an aluminum anode generator is obtained by simply bypassing the voltage tripler and separately rectifying the output from the coreless transformer.

For safety purposes, the anode of the X-ray generator, indicated generally by conventional symbol at 56, is kept at ground potential, with electrical circuit maintained through ground and a milliammeter 57 back to the positive terminal of the voltage tripler-rectifier in block 52. Thus, the negative side of the 30 kv. supply is connected to the tube cathode, which can be more conveniently isolated and insulated, as indicated by broken line enclosure 55, for protection of the operator against electrical shock. It should be mentioned that an additional advantage of the apparatus of this invention is that, since the current required for operation is less than 1 ma., the portable power supply described has built-in current limiting, so that lethal shocking of an operator is not possible. Nevertheless, all shocks are unpleasant and, therefore, protective insulation is provided as described.

A 6 volt battery charger 58 or, alternatively, a smaller Ni-Cd battery pack 59, supplies the power for cathode heating directly (6 volts, 0.3 amp.) via leads 60, and also powers a 200 Hz. oscillator provided with its own transformer-rectifier circuit, all indicated by common block 61, with output terminals connected on the negative side to the cathode element of generator 56 and on the positive side to acceleration focusing electrode 13, thereby providing the +300 volts accelerating potential hereinbefore described. The 200 Hz. oscillator-transformer-rectifier can, by relatively small circuit addition, be made to supply the +3000 volt potential required for the focusing tube 34 of the embodiment of FIG. 3.

In operation, X-ray generator 56 emits a cone of X-radiation having a relatively small apex angle of about 9°,thus rendering possible its use directly with a conventional Polaroid Land camera cassette as a back-reflection diffraction camera. Such an arrangement is illustrated schematically in cross section in FIG. 6, wherein X-rays from generator 56 pass through a hole 63 provided in the Polaroid Land film holder, denoted generally at 64, modified for direct light-tight attachment to the tube cap 11 or metal joinder ring 43, hereinbefore described but not detailed in this view, and also to support sample 65 on the opposite side. The film itself is modified for the service contemplated as shown in the enlarged inset by provision of a shielding black paper layer 67 and a phosphor screen 68 thereunder, both of which overlie the film 66.

Figure 6:
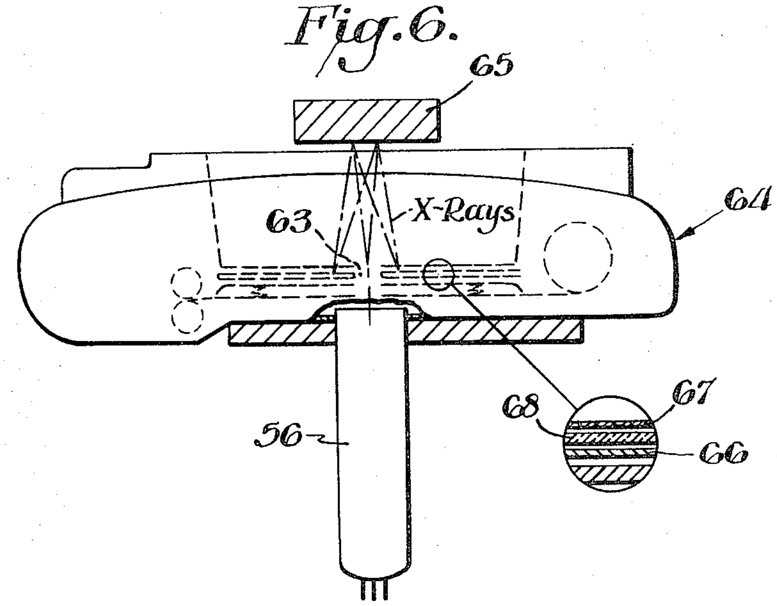
Figure 8:
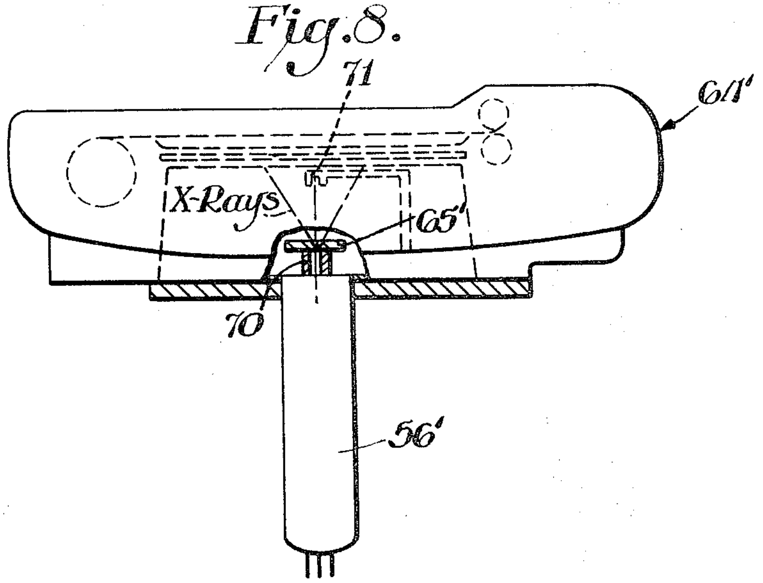
Figure 7:
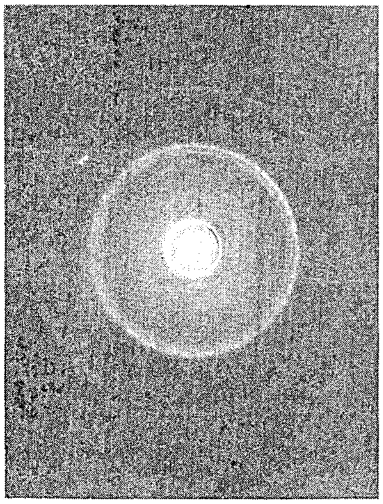

The assembly of FIG. 6 produces back-reflection patterns such as that shown in FIG. 7, which is that of a nickel foil sample obtained using 3000 speed Polaroid film with a 60 second time exposure and with a target current of 200 $\mu a$ at 30 kv., corresponding to an energy requirement of only 360 Joules When a simple collimator 70 and beam stop attachment 71 are incorporated, as shown in FIG. 8, with the sample 65' placed over the collimator and the Polaroid Land film holder 64' inverted from its position shown in FIG. 6 (thereby also inverting the modified film orientation), a simple yet efficient transmission diffraction apparatus is achieved.

Figure 8A:
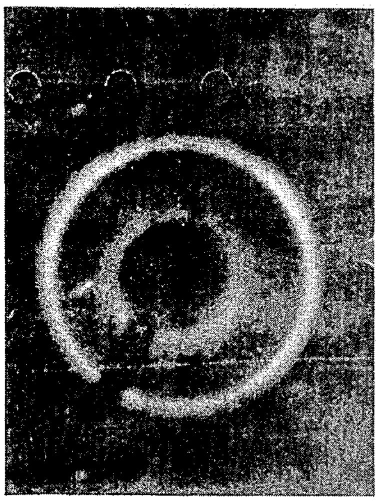
Figure 8B:

FIG. 8A is a transmission diffraction pattern from a paraffin sample using the apparatus arrangement of FIG. 8, whereas FIG. 8B is a transmission diffraction pattern from the same paraffin employing an apparatus in all respects like that of FIG. 8 but using a commercial standard size X-ray diffraction tube commonly used in the art. As shown, the patterns are quite similar in the detail obtained; however, the energy requirement for the commercial tube was 1875 Joules (50 kv., 7.5 ma., 5 sec. exposure), whereas the requirement for the tube of this invention was only 144 Joules (30 kv., 80 $\mu a$, 60 secs. exposure). Thus, the pattern of FIG. 8A required only about 7 percent of the energy required for the pattern of FIG. 8B.

Figure 9:
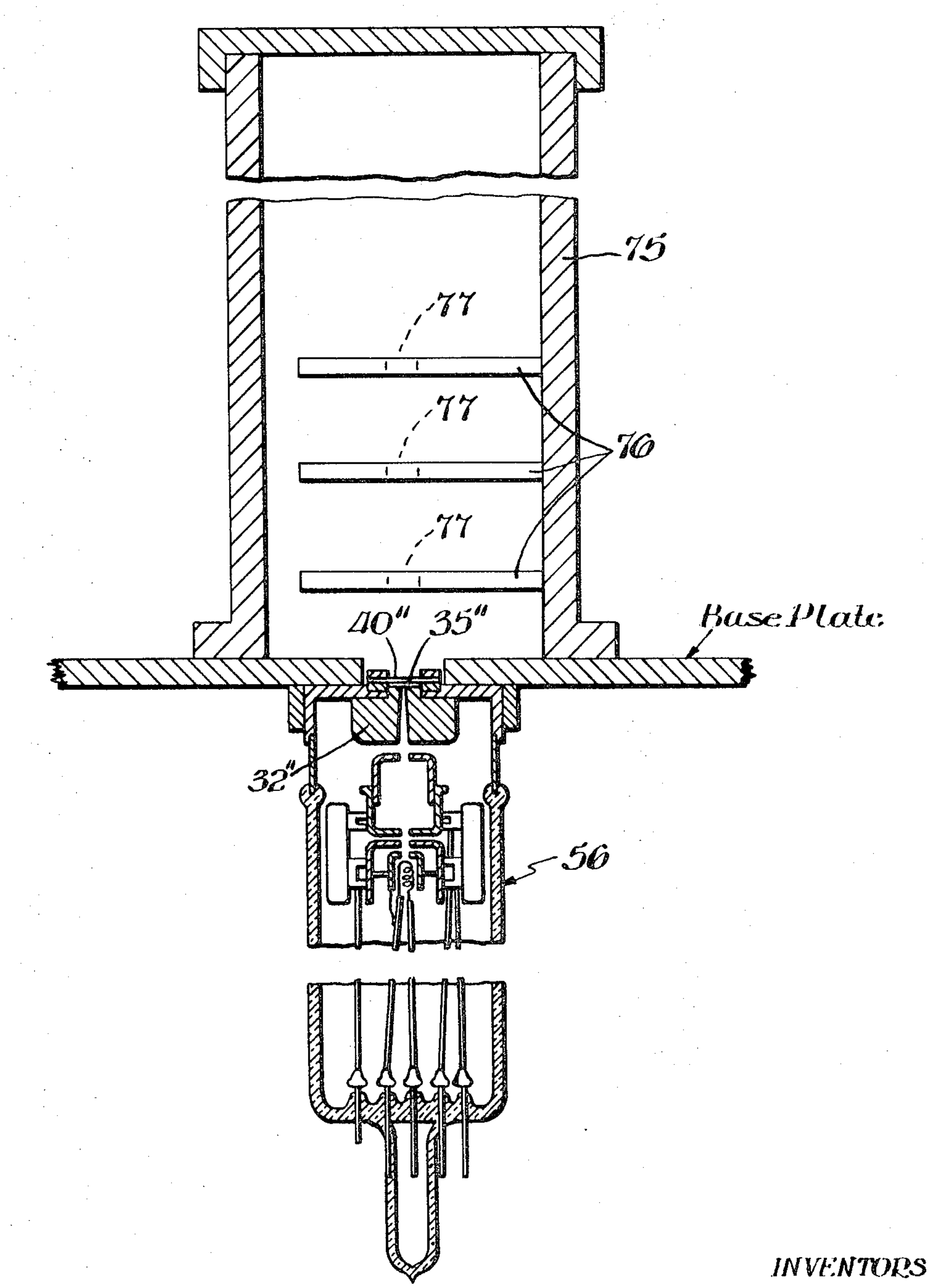
Figure 9A:
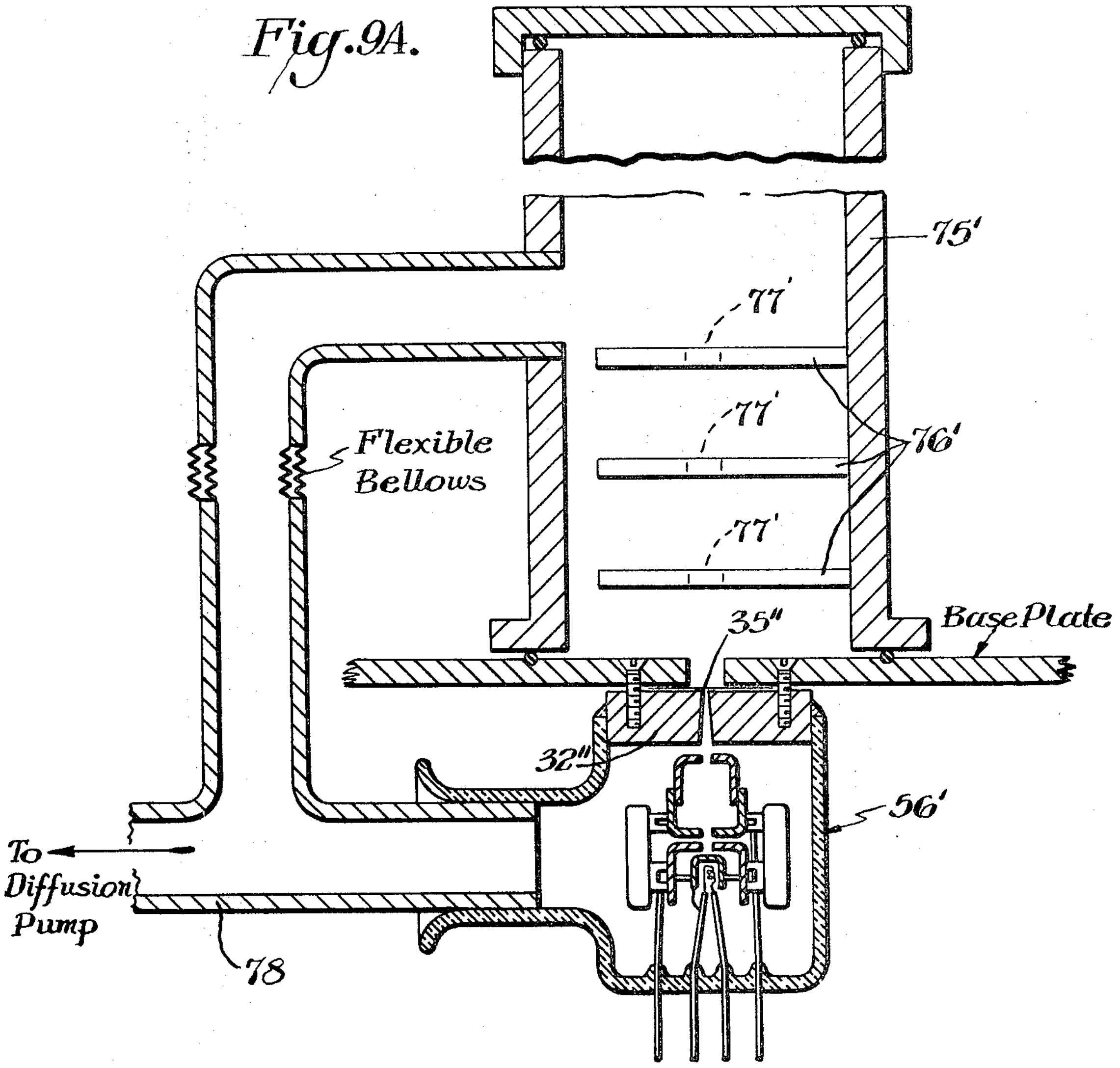

The X-ray generator of this invention is useful also in X-ray microscopy, and the embodiments of FIGS. 9 and 9A were devised for this service.

Both of these employ light-tight housings 75 and 75', respectively, provided with a succession of sample and film supporting shelves 76 and 76', respectively, centrally apertured at 77 and 77' to permit unobstructed passage of the X-ray beam. Shelves 76 and 76' are spaced at preselected fixed locations or, conversely, made vertically adjustable, to afford a wide choice of film and sample placement achieving the desired magnifications by combinations of X-ray and optical enlargement in accordance with the known techniques employed in X-ray microscopy.

The X-ray microscope embodiment of FIG. 9 operates at atmospheric pressure and utilizes the sealed X-ray generator embodiments of either FIGS. 1, 2 or FIG. 3 as desired. This design of apparatus easily meets the needs of many "in-process" X-ray applications, being both compact and portable.

The second embodiment of X-ray microscopy shown in FIG. 9A constitutes an evacuated demountable apparatus of this invention incorporating the X!ray generator 56' in common vacuum circuit (indicated generally at 78) with the housing 75'. This embodiment has the advantage of easy interchangeability of the anode block and its associated target foil, since the X-ray generator is of open construction, and also permits dispensing with the protective backup beryllium foil window 40'' of FIG. 9 because of the absence of a pressure differential between the X-ray generator per se and the interior space of housing 75'. Elimination of window 40'' is particularly advantageous due to its absorption of long wavelength X-rays, and removal of air molecules from the beam path by evacuation also eliminates undesirable absorption from this cause.

The high efficiency small spot and fine focus of the X-ray generator of this invention are particularly desirable features which render the construction useful for X-ray microscopy, regardless of whether the embodiment employed is the sealed tube or the demountable tube version. This is particularly true because of the excessively complex arrangements available in the prior art.

The demountable apparatus of FIG. 9A was employed to examine a foamed polymer sample as to which the longer X-ray wavelength of aluminum (8.34 A) was preferred over the more penetrating wavelength of copper (1.54 A) in order to provide greater contrast in the shadowgraph of cellular structure.

Figure 10:
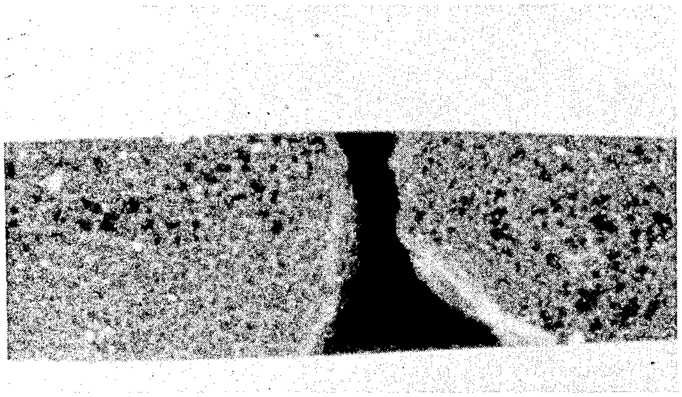

In this instance, two thin samples of the foamed polymer were placed side-by-side on a piece of film and the combination located one-half inch from the target window of the X-ray generator with an exit aperture of approximately 0.002 inch. The vacuum carried inside circuit 78 was, typically, $10^{116\ 5}$ Torr. The X-ray shadowgraph produced after an exposure of 60 secs. duration was photographically enlarged 50 times to obtain the representation of FIG. 10, which clearly reveals the cellular structure and permits a comparison thereof between the two specimens.

Figure 11:
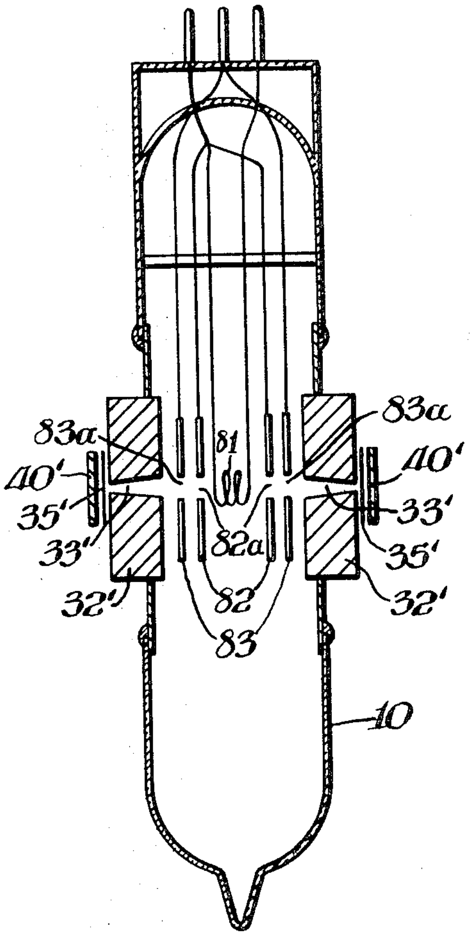
Figure 11A:
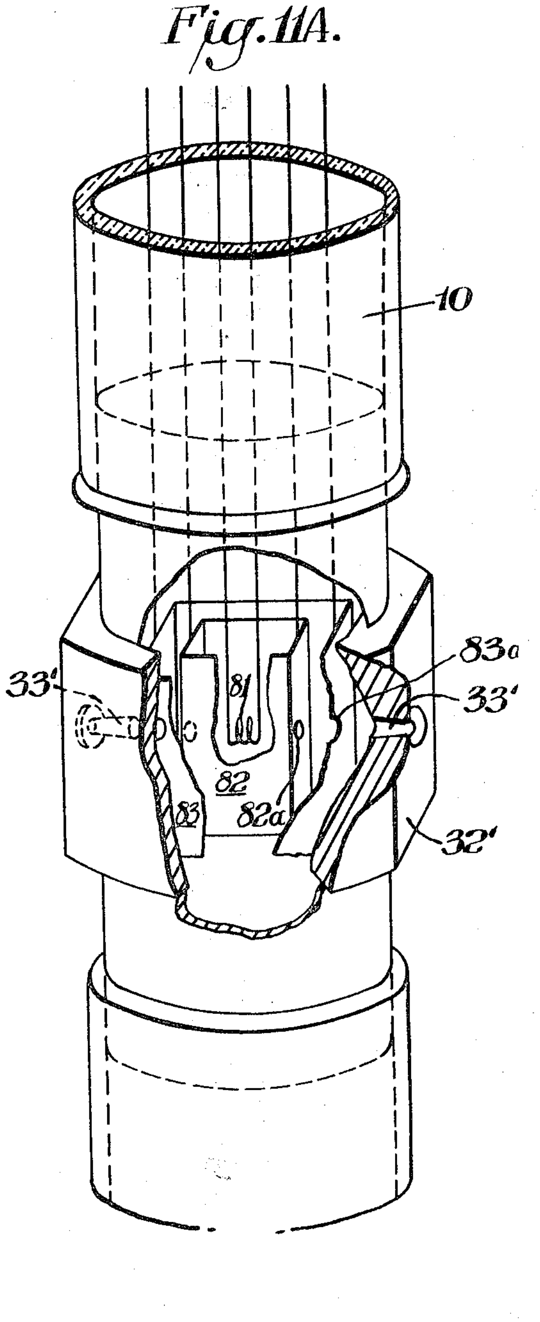

It is practicable to essentially double the overall efficiency of the X-ray generator of this invention by utilizing it in the self-reinforcing paired arrangement of FIGS. 11 and 11A.

Here a helical form cathode 81 is employed, centrally mounted within enclosing focusing and accelerating box electrodes 82 and 83, respectively, which are provided with oppositely disposed apertures 82*a* and 83*a*, respectively, in axial alignment with each other and with cathode 81, so that two electron beams are produced. The spacing of the coil ends of cathode 81 from electrode 82 is, typically, 0.050 inch, and between electrodes 82 and 83, typically, 0.120 inch. The diameters of apertures 82*a* and 83*a* are, typically, 0.110 inch and 0.160 inch, respectively. The equal spacings between electrode 83 and the confronting faces of anode 32' are, typically, 0.200 inch to 0.350 inch. The electron beams produced each impinge on individual anode targets 32' formed with frustoconical cavities 33' of the design hereinbefore described and also on foil target windows 35', backed by Be supporting windows 40', generating thereby two separate X-ray beams having the same advantageous small areas and fine focus as produced by the generators of FIGS. 1, 2 and FIG. 3.

In addition to the X-ray beams which are generated and emerge from the small diameter ends of cavity targets 33' and through the target windows 35' as hereinbefore described, X-rays are also generated which emerge from the large diameter ends of cavity targets 33'. The back-emitted X-rays produced in the generators of FIGS. 1, 2 and FIG. 3 cannot be utilized, since they are directed back into the electron guns where they are absorbed by the metal parts of the various electrodes. However, the X-ray generator of FIGS. 11 and 11A utilizes a portion of the back-emitted X-ray beams to augment the forward-emerging beams of each cavity. The back-emitted X-ray radiation from each cavity 33' passes through the pairs of apertures 82*a*, and 83*a* and is collimated by the opposite cavity 33'. A substantial fraction of the back-emitted X-ray output ultimately passes through foil windows 35' and 40' to reinforce original X-ray beam deliveries therethrough. To ascertain the degree of reinforcement provided by this embodiment, elements of the tube were assembled for operation within a bell jar which could be evacuated. The intensity of X-radiation emerging from one side was monitored first with operation such that both cavity targets were operating. Then, retaining the same voltages and beam current for one side as in the preceding test, the opposite anode was disconnected from the high voltage in order to eliminate the reinforcing contribution of back-emitted X-rays therefrom, and the output from the remaining side was monitored. For a collimated output with a divergence angle of about 2°, which is particularly effective for transmission diffraction service, it was ascertained from the respective monitored levels that the contribution of the back-emitted X-rays constituted an increase of 75—100 percent over the output from a single cavity. Thus, with the apparatus of FIGS. 11 and 11A not only can two X-ray beams be produced simultaneously, but also two beams which, when collimated for X-ray diffraction use, are of substantially doubled intensity.

From the foregoing, it will be understood that the X-ray generator of this invention is capable of relatively wide modification within the skill of the art without departure from its essential spirit, and it is therefore intended to be limited only by the scope of the appended claims.

What we claim is:

1. An enclosed, vacuum type X-ray generator comprising, in combination, a focused electron beam source incorporating a cathode member, a target block adjacent said cathode member formed with a frustoconical through-bore cavity of approximately 3°—7° included angle aligned axially with the electron beam output of said cathode member with the large diameter opening of said frustoconical cavity disposed towards said cathode member, means maintaining said target block at a high positive potential with respect to said cathode member, and a target foil window constituting an exit for X-ray radiation emission closing off the small diameter opening of said frustoconical cavity.

2. An enclosed, vacuum type X-ray generator according to claim 1 wherein said focused electron beam source incorporates a cathode member of open type delivering a pair of diametrically oppositely directed electron beam outputs, each provided with said frustoconical through-bore cavity, the axis of each said frustoconical cavity being in substantial alignment with the axis of said cathode member and with the axis of the other said frustoconical cavity, thereby directing X-radiation issued back through said large diameter opening of a given frustoconical cavity into said large diameter opening of said frustoconical cavity in alignment therewith.